March 30, 1965 N. NAGY ETAL 3,175,713
LOADER
Filed Feb. 6, 1961 5 Sheets-Sheet 3

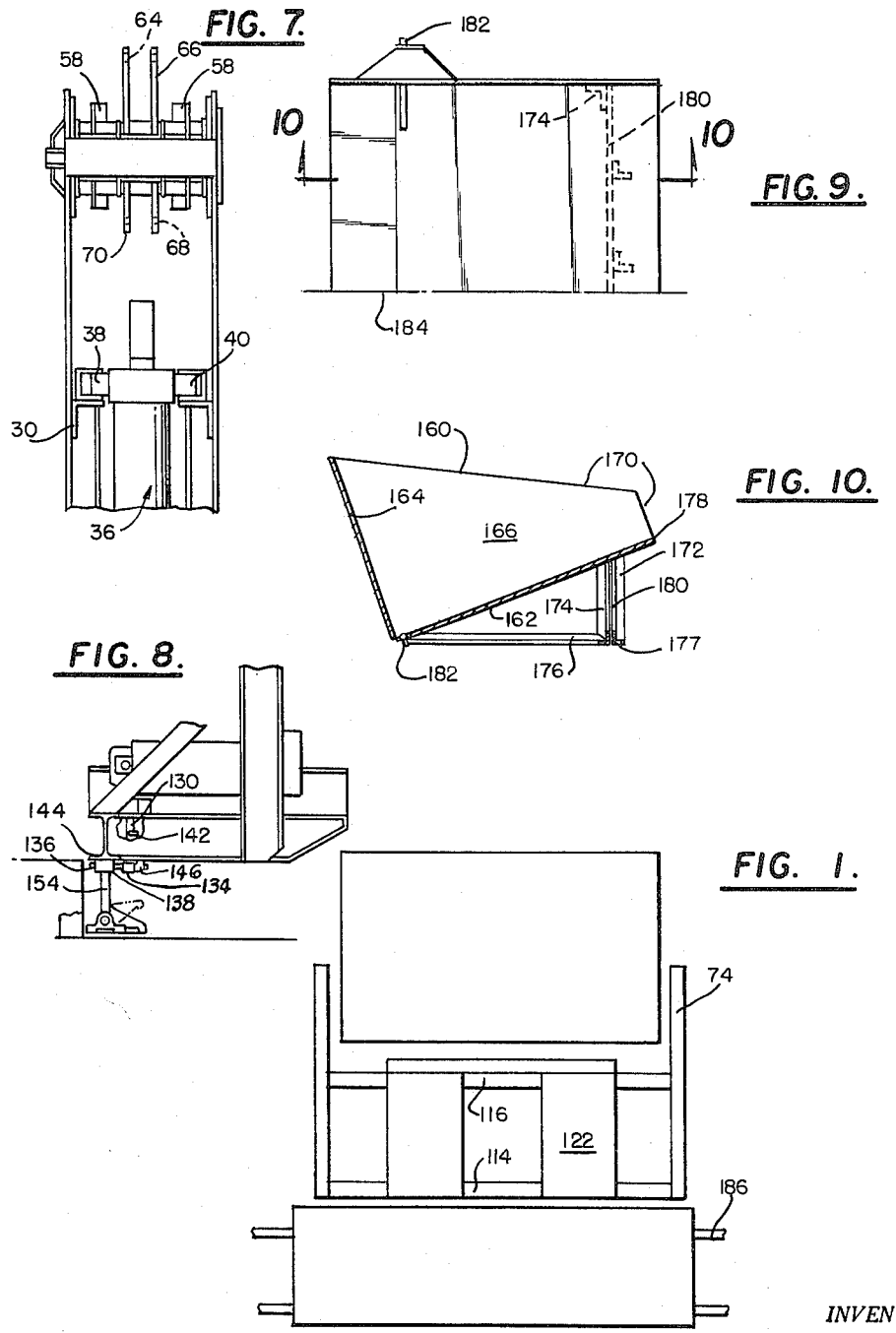

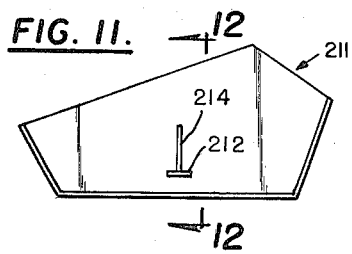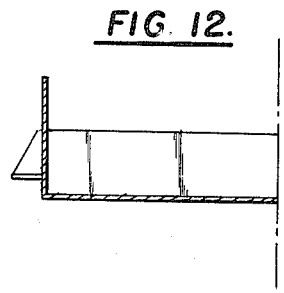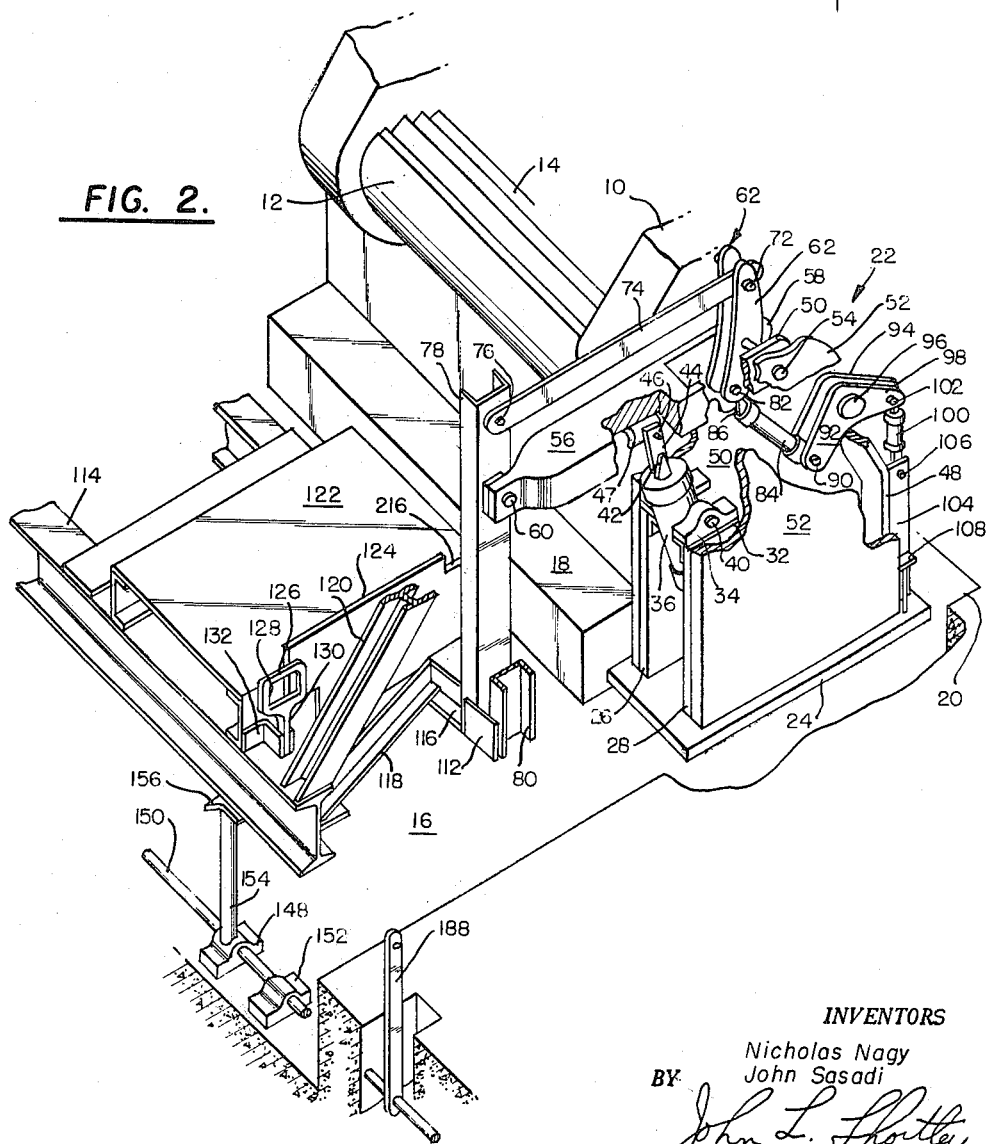

INVENTORS
Nicholas Nagy
John Sasadi
BY John L. Shortley
ATTORNEY

March 30, 1965 N. NAGY ETAL 3,175,713
LOADER
Filed Feb. 6, 1961 5 Sheets-Sheet 4

INVENTORS
Nicholas Nagy
John Sasadi
BY John L. Shortley
ATTORNEY

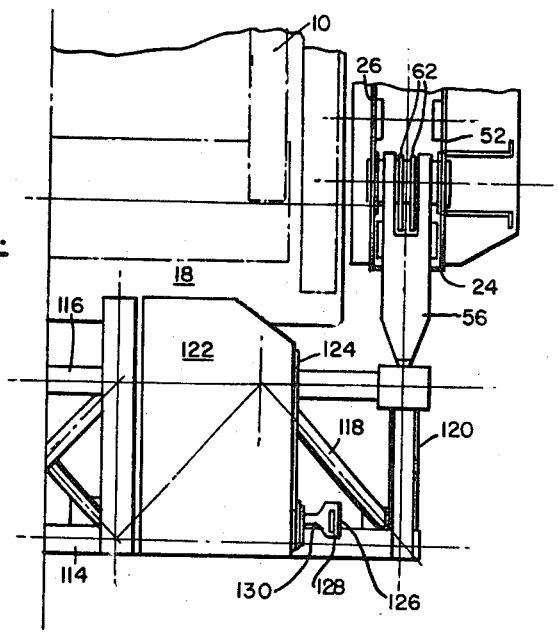
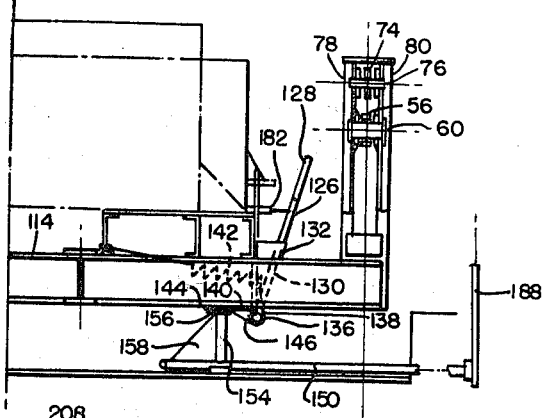
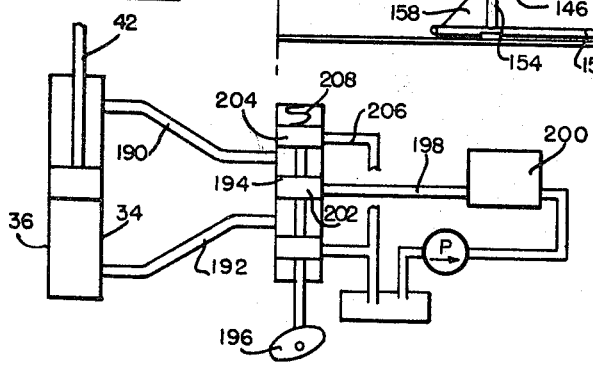

United States Patent Office 3,175,713
Patented Mar. 30, 1965

3,175,713
LOADER
Nicholas Nagy, Greenwich, Conn., and John Sasadi, Newark, N.J., assignors to Hewitt-Robins Incorporated, Stamford, Conn.
Filed Feb. 6, 1961, Ser. No. 87,382
10 Claims. (Cl. 214—308)

This invention pertains to loading and unloading apparatus, and in particular to an apparatus for use in association with a rotary shot or grit blasting machine. Shot blasting machines are useful, for example, in cleaning castings. It will be apparent, however, from the following description and the accompanying drawings that the apparatus disclosed herein may be useful for other purposes.

Shot blasting machines, such as those of the rotary barrel type, in many instances, comprise relatively substantial structures. For example: they may be obtained in capacities as great as a hundred cubic foot or better. The lip of the loading opening of these machines thus may stand ten feet or higher above the floor. Obviously some form of lifting and loading apparatus must be used to load and unload a machine of this size if it is to be economically operated.

In one preferred arrangement of a load device a track-way is provided aajacent the blasting machine and a special lifting device is positioned alongside the trackway. Boxes or containers of castings are adapted to be moved to or from the loading machine on trucks or cars. The boxes can be pushed directly onto the loader from the trucks or back onto the trucks. The loading means lifts the boxes up above the loading lip of the blasting machine and tilts the box to dump the contents into the machine. The loading apparatus must also be designed so that once the blasting has been completed a box can be placed in position to receive the material from the blasting machine. Insofar as known to us the loading devices heretofore used consisted of overhead hoist type structures and utilized cam-like tracks to guide a bucket to and from the blasting machine mouth. These known hoisting devices require a frame positioned to the front of the blasting machine and spaced a substantial distance forwardly thereof. Such older prior known apparatus employing cables and overhead hoist guide tracks might be correctly referred to as of the skip-hoist type. Relatively heavy steel members are required to support the overhead lifting mechanism of these "hoists." Further, such structure is expensive and requires a considerable amount of space to the front of the blasting machine in order to provide the tracking needed to effect the desired movements of the buckets. Accordingly, an object of the instant invention is to provide a hoisting means or loading device usable in association with a tumbling or blasting machine with which the space needed to the front of the blasting machine can be greatly reduced. Another object is to provide a loader with which it will be unnecessary to have a fixed, rigid framework positioned a substantial distance in front of the machine and whereby the floor area needed for a combined blasting machine and loading device installation will be held to a minimum.

Still another object is to provide a loader which eliminates the need for the heavy over-head hoisting structure and the track and its supports. Yet a further object is to eliminate cables and attendant drive mechanism. It is also an object to provide a loading apparatus which will leave the front of the blasting machine accessible for easy inspection, maintenance and cleaning and in which the structural elements needed for the loading machine fit closely adjacent to and at the side of the blasting machine.

In loading the blasting machine it is frequently necessary to agitate the box or else use other means to force some of the castings into the blasting machine. One of the objects of the instant invention, accordingly, is to provide a means for loading which can be agitated or rocked so as to facilitate the unloading operation of the box.

Another object of the instant invention is to provide a simplified structure for loading blasting machines which provides a means of readily dumping the material to be blasted into the machine.

Still another object of the invention is to provide a structure which is capable of receiving boxes, as from railway type cars, at floor level.

It is also an object of the instant invention to provide means for securing loading boxes on a loader for dumping of material into the blasting machine which automatically comes into operation during a lifting operation and automatically disengages when the casting box has been lowered to floor level.

Still another object of the invention is to provide a simple tilt structure for tilting the loading mechanism platform (which supports the loading boxes) in a direction the reverse of that required for dumping into the blasting machine in order to facilitate removal of the loading boxes from the loading apparatus.

Yet another object of the invention is to provide a platform stop for the loading machine for faciltating positioning of the platform in alignment with the floor which stop can normally be maintained in operative position but is readily operable to permit downward tilting of the platform.

One other object of the invention is to provide a linkage system for controlling the platform of the loading machine which will provide maximum incremental control.

A further object is to provide a lifting mechanism having enclosed parts which will facilitate housekeeping around the machinery. It is also an object to provide a lifting mechanism in which the pivoting pins needed for tilting, raising and lowering the platform are spaced a substantial distance above the floor to facilitate maintenance of a clean condition for these parts.

Another object of the invention is to provide an upward and downward tilting mechanism involving a single leverage system.

One further object of the invention is to provide hydraulic means for raising, lowering and performing the other operations needed which is free from cable and winch structures an involves simple pivot connections and hydraulic motors preferably of the piston-cylinder type.

These and other objects and advantages will become apparent from the following description and accompanying drawings wherein:

FIGURE 1 is a fragmentary diagrammatic top plan view showing a blashing machine, loader structure and trackway arrangement.

FIGURE 2 is a fragmentary perspective view of a loader constructed in accordance with the invention.

FIGURE 5 is a fragmentary top plan view.

FIGURE 6 is a fragmentary front elevational view, and also corresponds to a section taken along line 6—6 of FIGURE 3 with a portion of the concrete pit work used with the apparatus broken away.

FIGURE 7 is a fragmentary sectional view taken along line 7—7 of FIGURE 3.

FIGURE 8 is a fragmentary side elevation partly in section.

FIGURE 9 is a fragmentary top plan view of a loading box.

FIGURE 10 is a section taken along line 10—10 of FIGURE 9.

FIGURE 11 is a side elevation of a discharge box.

FIGURE 12 is a section taken along line 12—12 of FIGURE 11.

FIGURE 13 is a schematic representation of a portion of a hydraulic circuit.

Figure 3:
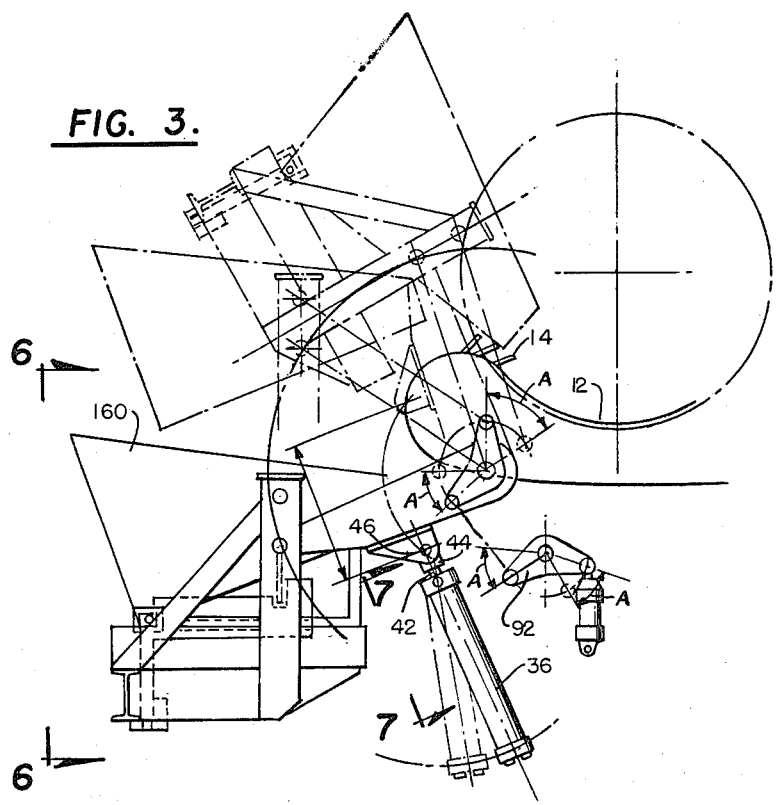
FIGURE 3 is a side elevational view showing the different positions which the loading mechanism can assume.

The rotary blasting machine or similar device with which the instant loader is particularly useful is often employed in foundries for cleaning sand from castings. The blasting machine comprises a means for tumbling cast articles and a shot blasting device which functions to disassociate sand, etc. from the castings while they are tumbling. However, it will be apparent from the following description that the loading machine herein disclosed and claimed can be used with other types of apparatus.

Referring now in particular to FIGURES 1 and 2 of the drawings, the loader is illustrated in association with a blasting machine 10. The later is normally mounted on the machinery floor. As is known in the art, the blasting machine has a forwardly opening mouth 12 adapted to receive the castings. A belt-like device 14 is utilized to tumble the castings. A pit 16 is provided in front of the tumbling machine support or platform 18. The pit has a pair of extensions 20, one on each side of the platform 18. Loader structure 22 is supported within the pit extensions 20 and alongside of the tumbling machine. The loader structure in each pit extension preferably is a duplicate of the structure in the other, and thus the structure in one pit only will be described.

By referring particularly to FIGURE 2 it will be noticed that there is a base plate 24 provided in the pit. The operating mechanism is supported on this plate by structure which includes a pair of channels, 26 and 28, which are connected to the plate. Each channel is capped by a journal block support 32 and a journal block 34.

A main lift cylinder 36 which is provided with a pair of trunnions 38 (FIG. 7) and 40 is pivotally supported in the journal blocks 34 by means of these trunnions. The lift cylinder has a piston rod 42, and the outer end of rod 42 is provided with a connector 44 which supports a pin 46. Pin 46 is received in depending brackets 47. The support structure includes a back plate 48 which extends upwardly from plate 24 in spaced relation to the channels 26 and 28. Also, a pair of side plates 50 and 52 are secured to the base plate 24 to the channels 26 and 28, respectively, and to the back plate 48. Preferably this is accomplished by welding. This forms a rigid, box-like structure. At a point slightly forward of the longitudinal mid-point of the side plates and above the base 24 a distance substantially 1½ times as high as the distance between the trunnions 38 and 40 and the base plate 24 there is provided an axle 54.

A lifting arm 56 has a bifurcated end 58 pivotally mounted on the axle 54. At its opposite end the lifting arm has a reduced section and is provided with a suitable journal adapted to receive pin 60. An upper rocker arm 62 is also pivotally supported on axle 54 between the arms of the forked extension of the lifting arm 56. As more clearly shown in FIGURE 7, the upper rocker arm has an upper pair of pin receiving openings 64 provided in a pair of spaced upper flanged arms 66, and a lower pair of pin receiving openings 68 in a pair of lower arms 70. A pin 72 (see FIGURE 2) is supported in the openings 64 in the upper rocker arms. A tilting link 74 has one end pivotally connected to the pin 72 and supports a pin 76 at its opposite end. The latter pin is rotatably received in suitable opposed bushings in a pair of depending channel members 78 and 80. The pin 60 on the forward end of the lifting arm 56 is also pivotally received in opposed bushings on the pair of channel members 78 and 80. The latter two channel members form part of a cradle structure described hereinafter.

The lower arms 70 of the upper rock arm 62 support a pin 82 within the openings 68 (FIG. 7). A tilting motor comprising a double acting cylinder-piston combination 84 has its piston rod 86 pivotally connected to the pin 82 by means of a pin receiving eye fixture. The cylinder, at its lower end, is provided with a suitable flange which is pierced to receive a pin 90. The latter is supported in one pair of arms 92 of a lower rocker arm unit 94. The lower rocker arm unit 94 is provided with bushings (not shown) that pivotally receive the pin 90. The unit 94 also is provided with a pair of bushings to receive an axle 96 mounted in the side plates 50 and 52. The lower rocker arm unit 94 has a second pair of arms 98 extending in a substantially opposite direction from the pair of arms 92.

A second tilting motor 100 is connected to rocker arm unit 94, which is preferably referred to as a reverse tilting motor, has its piston rod pivotally connected to the arms 98 by a pin 102. The cylinder of the motor is pivotally connected at its base to a plate 104 by a pin 106. Plate 104 extends downwardly to the base 24 and is secured to the back plate 48, as well as to stiffening plates 108. Both the tilting motors 84 and 100 are double-acting devices and they can be locked in a selected position, or independently or jointly actuated in either direction.

As stated above, the structure illustrated in FIGURE 2 at one side of the blasting machine is duplicated at the opposite side.

The channel members 78 and 80 form part of the cradle which is supported by the lifting arm, and which is also connected to the tilting link 74. The two upstanding channel members 78 and 80 are suitably interconnected by cross bracing such as 112. The cradle includes a floor comprising beams 114 and 116 rigidly connected by cross-bracing 118 and diagonal bracing 120. A pair of spaced platforms 122 (one at each end of the blasting machine) extend from the front to the rear of the cradle adjacent each side thereof. These platforms are adapted to support boxes hereinafter described: Vertical side plates 124 extend along the outer side of each of the platforms 122. The side plates are recessed at 216 slightly inwardly from the forward edge of the platforms 122.

A box hold down means 126 is also provided adjacent the outer end of each of the platforms. The box hold down means 126 comprises a flat plate member having a pintle-receiving-opening 128 adjacent its upper end. The opening is elongated and extends from a point alongside the plate 124 forwardly a substantial distance toward the front of the platform 122 (see FIGURES 2, 6 and 8). The hold down means 126 also has a downwardly depending arm 130 which extends between a pair of guides 132. As seen in FIG. 6, at its lower end the arm 130 is provided with a boss 134 and a pin 136 is secured in the latter boss. This pin is pivotally mounted in a boss 138 connected to plate 140. The plate 140 secures the boss 138 to the cradle. A tension spring 142 urges pivotal movement of the hold down means inwardly toward the top of the platform 122.

An arm 144 is secured to the pin 136. The arm 144 extends at an obtuse angle with respect to the arm 130 and, as illustrated in FIGURE 6, the arm 144 is adapted to abut the bottom of the girder 114. A brace 146 assists in support of pin 136.

A pair of trunnion blocks 148, 152 are positioned within the pit 16 adjacent each forward end or side of the cradle. A tilting link 150 rests on these blocks. The link 150 also extends through blocks 152. A base stop leg 154 extends upwardly from the link 150 at each side of the cradle. The upper end of leg 154 is provided with pads 156. A brace 158 (FIG. 6) is used to stiffen the legs 154.

Referring now to FIGURES 9 and 10: loading box 160 comprises a number of plate members welded together to form a hopper having a bottom 162, a rear wall 164 and side walls 166. The box has an open mouth and top 170. A stand comprising the inter-connected angle members 172, 174 and 176 and 177, etc. is secured to the base 162. The vertical legs formed by the angles 172 and 174 are spaced inwardly from the lip 178. The leg members are spaced laterally across the loading box with the number used being determined in accordance with the size of the box (see FIGURE 9). The vertical leg forming angle members are inter-connected by a plate 180. A pair of pintles 182 are secured to opposite sides of the box adjacent the rear end thereof. They project outwardly from the box. The boxes are of a width substantially that of the distance between the side plates 124 of the cradle. The pintles are positioned on the box so that when the box is moved onto the platforms 122 the pintles will abut the front edges of the side plates 124 and will be in line with the openings in the box hold down members 126 (see FIGURE 6). When the cradle is lifted each bar 144 will raise above its pad 156 and the box hold down means will swing inwardly over the pintles 182.

From FIGURES 1 and 3 it will be apparent that the boxes are adapted to be brought opposite the loading device on a carrier such as transfer car 186. They can there be pushed or pulled off onto the cradle.

It should also be noted that the operator can, through use of the handle 188, connected to the tilting link 150, rotate the stop (the cradle support post) outwardly from beneath the arms 144. This will result in the hold down means swinging inwardly prior to lifting of the cradle.

FIGURE 3 shows the very desirable manner in which the loading device can function in cooperation with the blasting machine, or any similar machine into which it is desired that castings or other elements, be dumped and/ or retrieved therefrom.

It will be readily understood by those skilled in the art that the lifting cylinder, which is a double acting cylinder, and the cylinders 84 and 100, which are also double-acting cylinders, are suitably provided with conduits and control valves for controlling admission of hydraulic fluid and the release therefrom to opposite sides of the double acting pistons within the cylinders. Each cylinder is preferably individually controlled. FIGURE 13 illustrates a type of control circuit which may be used with all three cylinders.

As seen therein, the double-acting cylinder 36 is connected by flexible conduits 190 and 192 to a valve 194. The valve may consist of a three-spool piston operated by a cam 196 shaped so as to provide alternate movement of the piston to either side of the neutral position in which it is illustrated in FIGURE 13. In this neutral position the high pressure line 198 from the accumulator 200 is blocked by the spool 202. If the cam 196 is rotated so as to move the spool upwardly, as viewed in FIGURE 13, the high pressure line 198 will connect to the line 192 leading to the cylinder 34 with obvious results. At the same time the spool 204 will be moved so as to uncover the exhaust line 206 and connect the latter to the line 190. On movement of the cam so as to present a lower side thereof to the valve operating rod the spring 208 will cause opposite movement of the spools and result in opposite movement of the double-acting piston in the cylinder 34. The cam 196 can be manually operated. Similar circuitry can be employed for controlling the other piston and cylinder combinations and also, in fact, many different combinations of readily available valves, pipes, and conduits may be employed to interconnect the cylinders in any desired manner within the skill of those in the art.

Once the bucket of castings is placed on the cradle the lifting cylinder 36 is actuated and the cradle raises the bucket. The parallelogram linkage 56 etc. forces a substantially vertical and inward movement of the cradle. In other words, the cradle platform will remain horizontal. During the final raising of the loader the mouth of loading box which, it should be noted, is designed so that it will stick beyond the inner end of the cradle (see FIGURE 3) will project above the belt and into the mouth of the loading machine 10. The tilting cylinder 84 is then actuated so as to tilt the box as indicated by dotted lines to FIGURE 3. The castings will now dump into the blasting machine. In this regard it should be noted that the blasting machine of the type referred to has a belt which tumbles the material.

It should also be noted that the pintles 182 function as pivot pins, (see FIGURE 3). The box will swing on these pins as the cradle is tilted by the tilt motor 84. This is due to the fact that as the inner end of the cradle lowers, the outer lip of the box will come into engagement with the belt of the blasting machine or the mouth of a similar machine. Normally the box lip would tend to lower and go downwardly with the inner end of the cradle, but the fact that it comes in contact with the belt causes it to stop, and the pintles 182 thus provide for continuous relative movement thereafter between the loading box and the cradle. The cradle will tilt further downward but the bottom edge of the loading box will remain on the belt. At this point it should be noted that the belt 14 can be operated in such a manner as to strike the box as it moves. This is desirable, in some instances, as it facilitates unloading of the box. Once the box is emptied the cradle is tilted upright to raise the box from the belt. Then the main lifting cylinder is operated until the box is lowered and it can be easily removed.

It should be noted, as pointed out above, that the box hold down means, consisting of the latch member 126 having the pintle openings 128 will release from the pintles 182 when the cradle reaches a lower horizontal position and the box hold down means operating arms 144 have contacted the pads 156.

Figure 4:
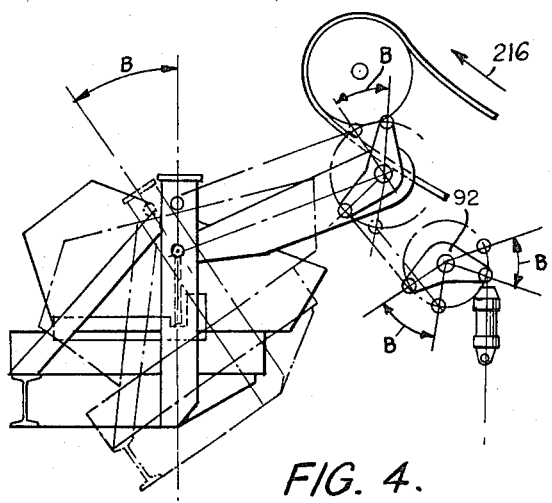
FIG. 4 is a similar view showing the different positions which the loading mechanism can assume in loading or receiving material from the blasting machine.
Figure 4A:
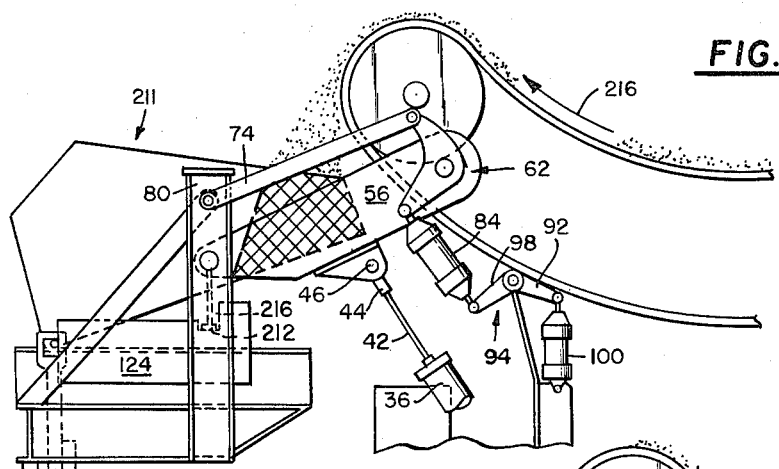
FIG. 4a is a fragmentary, side elevational view showing a discharge box positioned to receive material from the blasting machine.
Figure 4B:
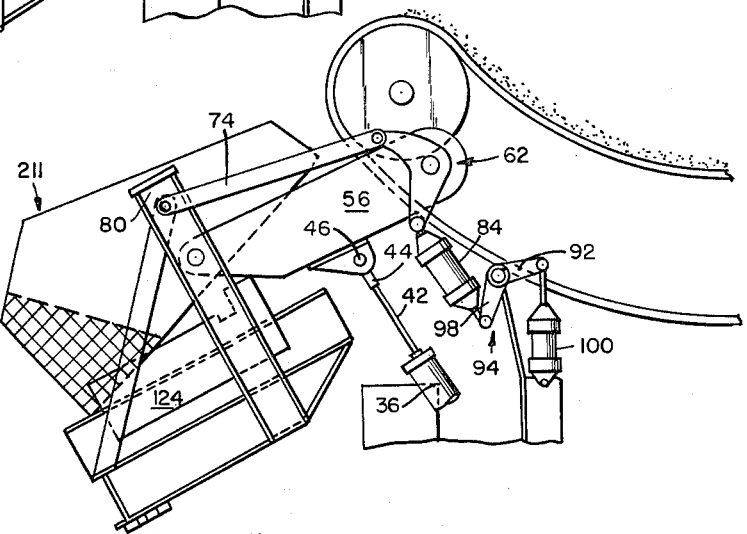
FIG. 4b illustrates the discharge box in a tilted position.
Figure 4C:
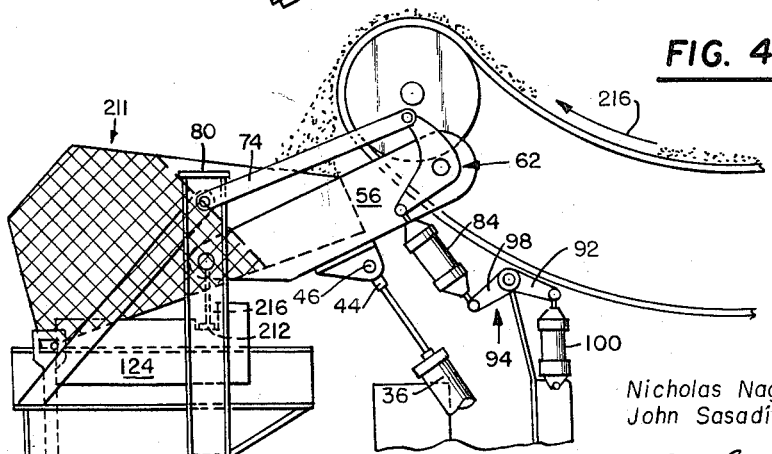
FIG. 4c illustrates the box, again in a normal position, for receiving material from the blasting machine.

After the "blasting" operation is completed, the discharge box 211 (FIG. 11) is placed on the cradle. It will also project rearwardly of the cradle (see FIGURE 4).

The discharge box 211 does not have pintles for cooperation with the latching means. The discharge box is not designed for tilting with respect to the cradle. However, it is desirable that this box be designed so that the cradle can be tilted to facilitate withdrawal of the box from the cradle (see below). The discharge box comprises a hold-on bar 212 projecting outwardly from each side. These hold-on bars are generally flat plate elements and can be combined with stiffening members such as 214 to improve their strength. The side plates 124 (see FIGS. 2, 4a, 4b, 4c) are each provided with hold-down bar receiving slots 216 into which the bars 212 are adapted to be received prior to raising for reception of the castings. This provides a secure means for preventing accidental movement of the boxes off of the cradle. The lifting cylinder is again actuated to raise the platform upwardly into a position slightly beneath the open mouth of the blasting machine. The blasting machine belt can be reversed in direction so as to drive the clean castings outwardly into the discharge box. After this has been accomplished the discharge box can be lowered.

The tilting motor 84, and the reverse tilting motor 100 are adapted to be operated independently of each other and independently of the lifting motor. When the motor 84 is locked motor 100 can be operated to tilt the cradle to a position designed for facilitating the loading and unloading of boxes thereon. FIGS. 2, 4, 4a, 4b, 4c illustrate the operation of the reverse tilting means for tilting the cradle and thus any box or other device placed thereon. This reverse tilting can be utilized when the cradle is adjacent, but slightly above the floor to facilitate removal of the containers from the cradle. The cradle, in this position, is very close to the normal rest position illustrated in FIGURE 3 in solid lines. When the cradle is in this position it will be impossible to tilt the cradle downward at its forward end until the stop legs 154 are withdrawn. The latter can be withdrawn by operation of the handle 188. When this is done, however, the box hold-down means 126 will move inwardly. The pintles 182 on the loading box will be grasped in the same manner they are grasped if the platform is raised above the lower "box-receiving" position. The inward movement of the hold-down means can be blocked to maintain these hold-down means in a withdrawn position.

However, when the empty loading box is on the cradle it can be easily removed without tilting. This tilting feature is thus more useful when the loaded discharge box 211 is on the cradle. The latter box does not have pintles or like projections which will be grasped by the hold-down means when they move inwardly. When the cradle is tilted in the lower position the rear of the discharge box, which is the portion closest to the blasting machine, can be more easily raised to free the bars 212 from the slots 216. The box can then be slid down the inclined cradle onto a car or truck.

The reverse tilting feature is also useful for another purpose; namely, distributing the material in the discharge box as it is received. This can be understood by referral to FIGURE 4a. The latter figure illustrates the discharge box raised and positioned beneatth the lip of the reversible belt on the blasting machine. As indicated by the arrow 216, the blasting machine belt can be operated so as to discharge the cleaned or otherwise treated units outwardly of the mouth of the machine. These units are thrown out into the discharge box 212. The discharge box will be loaded adjacent its forward end by this operation of the belt of the blasting machine. Often these units will collect at the end of the box as indicated by the hatching in FIGURE 4a. They will not slide down to the other end. When this end of the box thus becomes full the belt is stopped. Then the cradle is tilted backward as illustrated in 4b until the discharged items roll to the rear of the box. Next the box is tilted forwardly again and additional units are received from the blasting machine. These operations are continued until the box is filled and lowered. FIGURE 4c illustrates units again being moved into the box after several alternating filling and tilting operations.

A fork lifting device can be brought into association with the discharge box hold-down bars to lift the latter bars and the box upwardly from the cradle and forwardly thereof to remove it.

From the above it should be apparent that a simple effective means for associating a loading box, which must tilt in the discharging of the load into the machine, which does the tumbling, as well as a simple and effective means for mounting and supporting a box adapted to receive the articles from the machine has been provided. The sloping of the discharge box, it should be noted, is such as to provide a receiving mouth at the inner end of the cradle when in receiving position. The discharge box has a flat bottom, whereas the loading box has a tilted bottom so as to provide proper angle of slope for sliding of the material into the blasting machine. These features are dictated by the relationship of the elements needed to effect the various operations. It is apparent that it is not desirable to have a sloping bottom box for receiving materials from the blasting machine and that the sloping bottom box is necessary to tilt the materials into the machine. Further, it is apparent that there is need for some sort of latching of both boxes onto the cradle, yet there must be pivoting between the box and cradle during loading, whereas this is not necessary during unloading. Further, support of both boxes is achieved by a single platform.

It should be noted that the distance between pins 60 and 76 is the same as the distance between pins 72 and axle 54.

While we have shown and described a preferred form of our invention, it will be understood by those skilled in the art that many changes in detail and form may be made and accordingly we claim an exclusive right to all forms coming within the scope of the appended claims.

We claim:

1. In combination with a machine having an open-mouth for receiving and discharging articles and a movable feed device forming the lower outer lip of said mouth, a cradle lifting means positioned adjacent said machine, a loading box, said box having a base adapted to rest on said cradle and a discharge lip, means for removably, pivotally connecting the loading box to the cradle with the discharge lip facing said mouth and spaced upwardly from the base of said box, said cradle being movable by said lifting means upwardly and inwardly with respect to said mouth and being operable to bring said box into position with its discharge lip over the said lip of said open mouth, said lifting means being operable to tilt said cradle with said box in the latter position to move the discharge lip of said box into engagement with said movable feed device, the cradle being movable to tilt further with respect to said mouth after said box engages said device to raise the end of said box opposite said discharge lip of said box upwardly with respect to said mouth while retaining said discharge lip in engagement with said feed device for dumping of the contents of said box onto said feed device and for agitation of said box by said feed device to facilitate dumping.

2. The combination set forth in claim 1, including said cradle comprising a platform for vertically supporting said box, said box having a base adapted to rest on said platform, said means for pivotally connecting said box to said cradle comprising a pintle connected to said box, a movable arm member having a normal position and a pintle receiving opening normally positioned to receive said pintle when said box is in loading position on said platform, means resiliently urging said arm member into its normal position, a cam member positioned to engage said arm member durnig downward movement of said cradle with respect to said machine and operable to move the arm out of its normal position when said cradle is in position for removal of the loading box therefrom.

3. The combination set forth in claim 2 wherein said cam member is movably mounted for selective movement into and out of position to engage said arm member.

4. In a loading means for lifting a box-like container and for tilting the latter container, a lifting arm, a tilting link, a platform, said lifting arm and said tilting link being connected to said platform for relative pivotal movement, and being in parallelogram-like relationship to said platform, powered operating means connected to said arm and to said link for effecting independent relative movement of said link and said arm and for raising and tilting said platform, the powered operating means connected to said link comprising a linkage means including a first pivotally mounted operating motor for moving said link to tilt said platform and a second pivotally mounted operating motor for moving said link independently of said first motor, said second motor being serially and pivotally connected to said first motor and independently operable to adjust the effective length of said linkage system.

5. The apparatus of claim 4 wherein said motors are serially connected by a rocker arm pivotally mounted on the loading means whereby said second motor provides a reverse tilting of said container.

6. In a loading means for lifting a box-like container, a platform, means for raising said platform, said platform comprising spaced side plates adapted to receive a container, said side plates having forward edges, a container adapted to rest on said platform, said container having pintles projecting on opposite sides thereof, said pintles being adapted to abut respectively on the said side plates, a moveable arm member connected to said platform and movable laterally with respect to each of said side plates, each said arm member having a pintle receiving opening and being adapted to be moved to pivotally receive one of said pintles in said opening while the latter pintle is abutting one of said plate, means for so moving each said arm member to pivotally affix said container to said platform, means for tilting said platform for pivotal movement of said container relative said platform to facilitate dumping of material from said container.

7. The loading means of claim 6 including each said arm member having an extension, means normally cooperable with said extension to affect positioning of the latter arm member out of engagement with the respective one of said pintles when said platform is in a container receiving position, said means for moving each arm member normally urging each said arm member into pintle engaging position, the latter means being operable to effect the engagement of said arm member with a respective one of said pintles when said platform is moved out of said container receiving position.

8. The loading means of claim 7, including means for moving said means cooperable with said each arm extension out of a normal position to effect movement of said arm into pintle engaging position when said platform is in container-receiving position.

9. In a loading means for lifting and tilting a box-like container, a platform, a lifting arm, a tilting link, said arm and said link being pivotally connected to said platform and to each other and forming a parallelogram linkage system with said platform, a base, said lifting arm being pivotally connected to said base, means for raising said arm and link and attached platform while said arm and link remain parallel, a rocker arm pivotally connected to said base, said tilting link being pivotally connected to said rocker arm, a tilting motor pivotally connected to said rocker arm and operable, alternately, to move said tilting link relative said lifting arm while the latter is stationary or maintain said link and said arm in parallel relationship while said platform is moving, a second rocker arm pivotally connected to said base and to said tilting motor, a reverse tilting motor pivotally connected to said second rocker arm and said base, the first mentioned rocker arm, and said tilting motor, and said second rocker arm and said reverse tilting motor being serially connected and forming an adjustable length link between said tilting link and said base, said adjustable length link being adjustable to move said tilting link relative to said lifting arm in order to effect tilting of said platform relative to said arm.

10. The loading means of claim 9, including hydraulic means for independently operating said tilting motor and said reverse tilting motor to effect extension or retraction of said adjustable length link.

References Cited in the file of this patent

UNITED STATES PATENTS

| | | |
|---|---|---|
| 2,789,711 | Burrus | Apr. 23, 1957 |
| 2,797,835 | Avery et al. | July 2, 1957 |
| 2,899,089 | Ajero | Aug. 11, 1959 |
| 2,926,803 | Collins | Mar. 1, 1960 |
| 2,980,271 | Ulinski | Apr. 18, 1961 |